(12) United States Patent
Smarsh et al.

(10) Patent No.: US 6,950,718 B2
(45) Date of Patent: Sep. 27, 2005

(54) COMPUTER CONTROLLED GRINDING MACHINE

(76) Inventors: Steven G. Smarsh, 32365 N. River Rd., Harrison Township, MI (US) 48045; Brian M. Gehrke, 21825 N. Nunneley Dr., Clinton Township, MI (US) 48036

( * ) Notice: Subject to any disclaimer, the term of this patent is extended or adjusted under 35 U.S.C. 154(b) by 0 days.

(21) Appl. No.: 10/507,729

(22) PCT Filed: Mar. 18, 2003

(86) PCT No.: PCT/US03/08388

§ 371 (c)(1),
(2), (4) Date: Sep. 14, 2004

(87) PCT Pub. No.: WO03/081512

PCT Pub. Date: Oct. 2, 2003

(65) Prior Publication Data

US 2005/0119780 A1 Jun. 2, 2005

Related U.S. Application Data

(60) Provisional application No. 60/365,395, filed on Mar. 18, 2002.

(51) Int. Cl.[7] .......................... G06F 19/00; B24B 49/00; B24B 51/00
(52) U.S. Cl. ............................. 700/164; 700/159; 451/5
(58) Field of Search ................................ 700/159, 160, 700/164, 180; 451/5, 11, 15, 49

(56) References Cited

U.S. PATENT DOCUMENTS

| | | | |
|---|---|---|---|
| 4,524,545 A | 6/1985 | Giebamnns | |
| 4,570,386 A | 2/1986 | Unno et al. | |
| 4,639,170 A | 1/1987 | Palm | |
| 4,731,607 A | 3/1988 | Yoneda et al. | |
| 4,854,568 A | 8/1989 | Baeza et al. | |
| 5,002,264 A | 3/1991 | Nimtz | |
| 5,097,602 A | 3/1992 | Cross et al. | |
| 5,103,700 A | 4/1992 | Read, Sr. | |
| 5,121,571 A | 6/1992 | Smarsh | |
| 5,174,179 A | 12/1992 | Hiestand | |
| 5,527,400 A | 6/1996 | Smith et al. | |
| 5,595,525 A | 1/1997 | Hayashi et al. | |
| 5,630,747 A | 5/1997 | Haller | |
| 5,647,788 A | 7/1997 | McHugh et al. | |
| 5,746,643 A | 5/1998 | Terasaki et al. | |
| 5,746,644 A | 5/1998 | Cheetham | |
| 5,766,057 A | 6/1998 | Maack | |
| 5,844,805 A | 12/1998 | Uchimura et al. | |
| 5,893,734 A | 4/1999 | Maack | |
| 5,957,752 A | 9/1999 | Katakura | |

*Primary Examiner*—Leo Picard
*Assistant Examiner*—Charles Kasenge
(74) *Attorney, Agent, or Firm*—Cargill & Associates, PLLC

(57) ABSTRACT

A computer (100) located within an electrical console (102) and a rotationnaly operating machine generally denoted by the number by the numeral (10). As must be noted, the rotating machine of the present example and figures can be used for any rotational operation, such as cut-off operations, lathe work, OD grinding, ID grinding, turning, plunge grinding, form or infeed grinding. The various materials of possible workpieces may include any steel, including stainless steel, tungsten, ceramics, elastomers, plastics and many other materials. The selection of the material of the grinding wheel can be made to accomodate just about any material in a workpiece

11 Claims, 11 Drawing Sheets

COMPUTER CONTROLLED GRINDING MACHINE

CROSS REFERENCES TO RELATED APPLICATIONS

This application claims the benefit of U.S. Provisional Application No. 60/365,395 filed on Mar. 18, 2002.

TECHNICAL FIELD

The present invention relates to computer controlled machines, and more particularly, to a self-programming computer controlled centerless grinding machine.

BACKGROUND OF THE INVENTION

The advantages of an easily programmed grinding machine are numerous. In prior art grinding machines that are controlled by computers, the programming requires a great deal of time, and the skill of a CNC programmer. Grinders and screw machines which perform similar operations that have been controlled by computers are most favorably used for high production runs of a particular configuration of a workpiece, but they are not very good for smaller runs, or for making an easy transition from one type of grinding operation to another.

Furthermore, training a machine operator to program his own CNC controlled machine takes a great deal of time and training, and requires classes and instructions for learning how to program the machine. A great advantage could be had if the machine was easily programmed by any untrained personnel, and would especially be of an advantage if it could be achieved within a few minutes. In that way, anyone would be able to walk up to the machine, follow the computer prompts, and program the machine for any desired operation within a few moments.

The computer software that would be able to enable a computer to control a machine would be most advantageously utilized if the computer screen itself could have audio commands, instructions and directions for immediate programming. It would also be especially helpful if the computer could talk to the new operator and "walk" the new operator through the procedure of reprogramming. All the new operator would need are the specifications for the desired resulting workpiece, and knowledge of the desired shape of a configuration preferred, along with the radiuses, lengths and distances, and rotation required in order to achieve their desired resultant product.

Conventional CNC grinding operations require lengthy training and programming times for a grinding operator to program his computer for the performance of accurate grinding operations. Normally, programming a typical CNC grinder takes a skilled programmer the significant portion of a day. Recently, grinding machine manufacturing companies have been trying to make this training and programming procedure less time consuming, and have worked on making the machines more user friendly. These attempts have not met with much success as they are still too complicated. Many machine operators are unfamiliar with the workings of computers, and they are uncomfortable and/or unknowledgeable about programming computers to perform grinding operations. Needless to say, it would be a potential advantage to the grinding community if the computers could be used with a minimum of training and reprogramming time for new grinders. In addition, it would save a lot of time for one-off and low production jobs that could then be interjected between various production grinding operations. In these one-off situations, conventional reprogramming of a grinding machine in the middle of a production run would usually be prohibitive due to the amount of time it would take to reprogram all the computer software that runs the grinder.

It would be even more potentially advantageous if the computer could be programmed in minutes by any untrained operator by listening to audio commands, only having to touch a minimum number of keys on the computer keyboard. The present invention seeks to provide a computer controlled grinder and computer system that enables nearly anyone to be programming a grinder within a few minutes.

Grinding machine shops would find a great advantage to have computer controlled grinders that could be stopped in the middle of a production run, reprogrammed for a small number of grinding jobs that require a different shape than the production run workpieces, and then have the capacity to quickly reprogram the machine to return to their production run grinding job.

SUMMARY OF THE INVENTION

In accordance with the above-noted advantages and desires of the industry, the present invention provides many embodiments, one of which includes a novel audio command computer controlled rotational or grinding machine with one or more rotational axes having a computer attached thereto directing the machine during its rotating or grinding operations. The computer preferably has voice prompted and audio command computer software which includes self-programming features for running the machine after the input of data points. The present invention also includes an embodiment of a method of creating new computer programs attached to the machine for directing the computer to create a new program after the entry of certain parameter values and data points. In yet another embodiment of the present invention, there is included a method of grinding and one of dressing a grinding wheel and/or a regulating roller to maintain a true dimension for those components.

One specific preferred embodiment has certain features, including a grinding machine which has a very high accuracy of the resulting ground workpieces due to a combination of a computer controlled dressing routine for both the grinding wheel and the regulating roller.

Another preferred specific embodiment of the present invention has other features which may be beneficial in machine operations requiring more than two longitudinal axes of rotation within the grinding procedure.

A computer controlled grinding machine is disclosed including a machine base, a workpiece support which is rotatable about a first rotational axis, and a securement device for the workpiece which is attached to the support in order to secure the workpiece. A first rotating motor is utilized to rotate the workpiece about the first rotational axis, while a second rotating motor is used to position the workpiece about a second rotational axis. The first rotational axis is the up and down axis for grinding away the outer diameter of a workpiece, while the second rotational axis is utilized to go in and out in order to shape desired forms on the workpiece, resulting in the desired product. The grinding machine also includes a grinding wheel and a regulating roller to support and grind the workpiece in order to achieve its desired shape. Furthermore, the machine is also directed by the computer to cut radiuses and angles or back tapers, as desired. Generally speaking, a pivot blade is also included for holding the workpiece in place, although there are many embodiments which would not utilize such a pivot blade.

A computer is utilized to control the rotation and location of the first and second rotational axes, and the computer also controls the velocity of the rotation, the angle, the plunging, and the roll-off. It is most advantageous to further include a source of coolant which is sprayed on the workpiece as it is being ground for the optimum results.

In get another preferred embodiment of the present invention, there is described computer software which is employed to control the grinding machine. The preferred Pick-N-Place™ software is an extremely convenient software which can be used to create a computer program itself within a very short period of time and with very little expertise on the part of the operator by following audio commands.

In yet another specific preferred embodiment of the present invention, there is a dressing routine which incorporates two types of dressing modes, one for the grinding wheel and one for the regulating roller. Again, these dressing modes are controlled by the computer software and the computer described hereinabove.

The invention and all of its various embodiments are particularly useful for applications of centerless grinding, although they may be used on any rotational machine which requires direction from a computer for providing the desired resulting product. Therefore, the present invention and its various embodiments would be useful in the area of lathing, plunge, form or infeed grinding, sanding, buffing, polishing, cut-off operations, OD grinding, ID grinding, turning or any other such rotationally operated machine.

Although the invention has been described by way of a specific example of a centerless grinding machine hereinbelow, it must also be realized that minor modifications that do not require undue experimentation on the part of the practitioner are covered within the scope and breath of this invention in order to perform the above-described other rotationally operated machines equally well. Additional advantages and other novel features of the present invention will be set forth in particular in the description that follows and in particular will be apparent to those skilled in the art upon examination or may be learned within the practice of the invention. Therefore, the invention is capable of many other different embodiments and its details are capable of modifications in various aspects which will be obvious to those of ordinary skill in the art, all without departing from the present invention. Accordingly, the rest of the description will be regarded as illustrative rather than restrictive.

BRIEF DESCRIPTION OF THE DRAWINGS

For a further understanding of the matter and advantages of the expected scope and various embodiments of the present invention, reference shall be made to the following detailed description, and when taken in conjunction with the accompanying drawings in which like parts are given the same reference numbers, and wherein.

DETAILED DESCRIPTION OF THE INVENTION

In accordance with the objects and advantages discussed above, the present invention provides a way to utilize new audio command computer software that enables a new trainee to walk up to a rotational grinding machine, such as the ones fully disclosed in U.S. Pat. No. 5,121,571 and U.S. patent application Ser. No. 09/720,576, which are incorporated herein in their entirety, and allows that trainee to be totally trained within a short period of time. The computer speaks to the trainee, giving audio commands for data value entries in order to make the grinder perform in the desired method. If a person can hear and push an occasional button, they will be able to operate the grinding machine within minutes.

In order to practice the present invention, the trainee first walks up to the front of the computer monitor stand. From the main menu, the trainee is asked whether he wants to start from the very beginning, or if he has already been trained, then he can start the program from further on. The following is a screen-by-screen description of certain data entry screens of the computer software, and this patent application is accompanied by three CD-ROMs with a full version of the computer software, being deposited herewith in the Patent Office as an attachment to this application.

The audio command computer software of the present invention being disclosed herein is designed to provide commands that control any type of rotationally operating machine, but it is especially useful for a high tolerance centerless grinding machine. Although all the examples relate to the centerless grinding machine, it must be emphasized that this computer software can clearly be adapted, without undue experimentation, to control any other sort of rotationally operational machines, especially cut-off operations, lathes, OD and/or ID grinders, plunge, form or infeed grinders, turning machines, tool and die grinding equipment, or any other type of manufacturing equipment.

Having said that, and understanding that the present invention will not be limited in its scope by the examples following, the next seventeen Figures will focus on the application of operating the centerless grinding machine disclosed and claimed in U.S. patent application Ser. No. 09/720,576.

Figure 1:
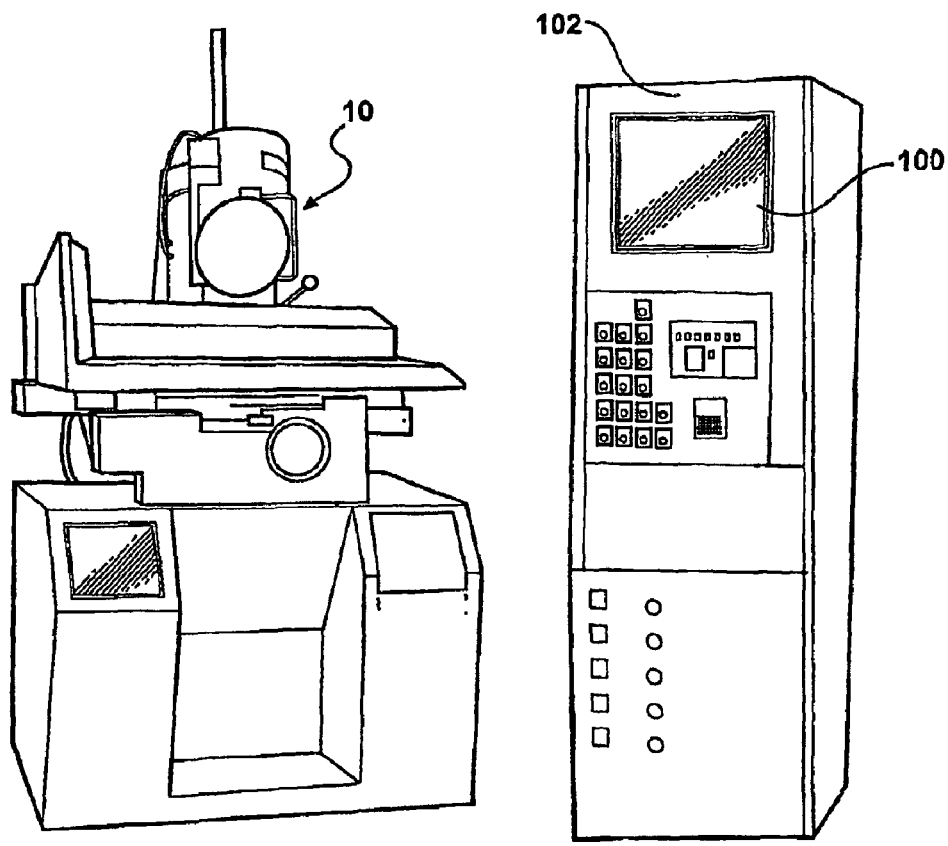
FIG. 1 is a front elevational view of a centerless grinding machine in accordance with one of the specific preferred embodiments of the present invention and a computer attached thereto in accordance with the present invention.

FIG. 1 illustrates the connection between a computer 100 located within an electrical console 102 and a rotationally operating machine generally denoted by the numeral 10. As must be noted, the rotating machine of the present example and figures can be used for any rotational operation, such as cut-off operations, lathe work, OD grinding, ID grinding, turning, plunge grinding, form or infeed grinding, in addition to the below described centerless grinding. The various materials of possible workpieces may include any steel, including stainless steel, tungsten, ceramics, elastomers, plastics and many other materials. The selection of the material of the grinding wheel can be made to accommodate just about any material in a workpiece. Such a selection is well known in the art.

As one will be able to appreciate upon further review, the computer program disclosed herein may be used to advantage with any of these rotational operations without undue experimentation on the part of those of ordinary skill in the art. Any such variation of use is contemplated herein. However, for ease of explanation, this discussion will be confined to centerless grinding.

Figure 2:
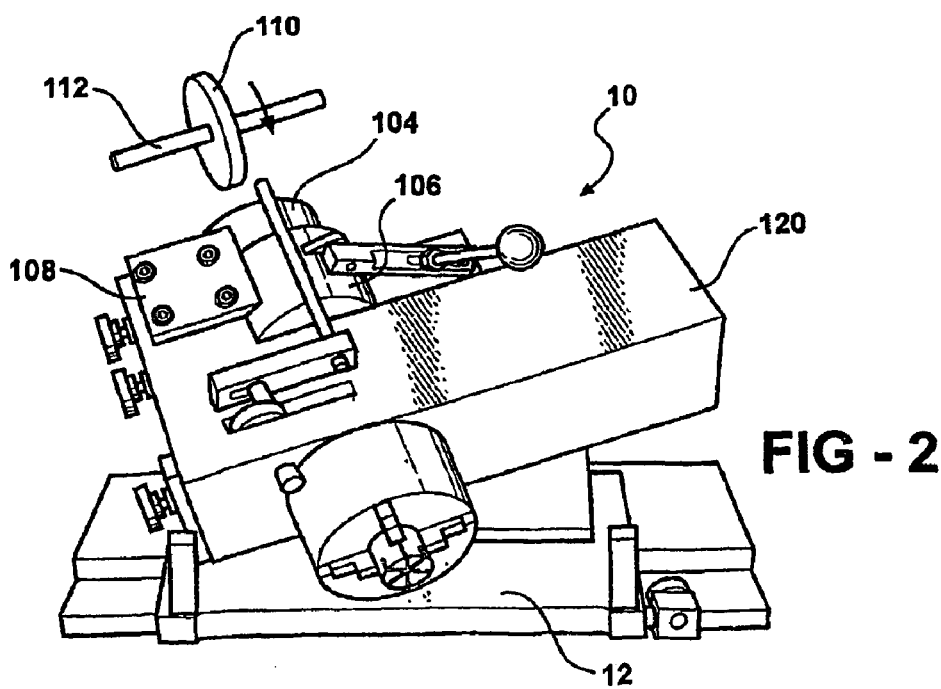
FIG. 2 illustrates the preferred centerless grinding machine of one embodiment of the present invention which is compatible with the computer software described hereinbelow.

Looking now to FIG. 2, the rotational machine shown in FIG. 2 is shown as a grinding machine 10 located on a machine base 12. A complete description of this machine and the other parts are described and called out in U.S. Pat. No. 5,121,571, and U.S. patent application Ser. No. 09/720, 576 which are both incorporated herein in their entirety. A dressing wheel 104 is now included, secured on the extending portion of the spindle. A grinding wheel 110 rotates about a spindle 112 and is a separate wheel having a rotational axis that is parallel to that of the dressing wheel 104 and a regulating roller 106. Spindle 112 is attached to a rotating motor (not shown). Dressing wheel 104 and regulating roller 106 are both rotated by a motor 120 shown in its black box.

In operation, the grinding wheel can be lowered down onto the workpiece as the regulating roller 106 rotates the part to be ground by the grinding wheel. Grinding machine 10 can hold the workpiece to be ground entirely on the regulating roller to effect centerless grinding, or the end of the workpiece can extend over the end of the regulating roller for plunge grinding, form grinding (if the grinding wheel has been formed), and infeed grinding.

Due to the design of the grinding machine, no indicating is necessary. Parts being ground can be removed from the regulating roller, inspected, and then returned to the regulating roller by hand without any indicating, while still having part tolerances repeat within millionths of an inch.

In order to effect the dressing operation of the grinding wheel, the grinding wheel may be jogged forward of the regulating roller to contact the dressing wheel attachment 104, and the computer can regulate how the grinding wheel is dressed. Dressing of the regulating roller is made easy by pivoting back the work blade 108. As can be seen, both the work blade and the regulating roller can be dressed simultaneously.

In accordance with the one of the preferred embodiments of the present invention, a computer controlled grinding machine includes a machine base 12 and a regulating roller 106 that acts as a workpiece support rotatable about spindle having a first rotational axis. A work blade 108 acts as a workpiece mounting attached to the workpiece support for securing the workpiece for grinding. A grinding wheel 110 may be made of diamond, borazon or any other conventional material is used for grinding the workpiece. Depending upon the material of the workpiece, the grinding wheel may be selected of a different material to cut the workpiece. A regulating roller may be mounted on a separate spindle, and it is used for supporting and rotating the workpiece.

A first rotating motor for rotating the grinding wheel about a first rotational axis may be made of any suitable configuration, while a second rotating motor rotates the regulating roller and the workpiece about a second rotational axis. A computer connected to these motors is controlled by computer software to direct the rotation and location of the first and second rotational axes, thereby effecting the desired grinding pattern.

The preferred computer emits pre-recorded audio controls to the machine operator requesting the input of various data entries into the computer to correspond with a desired resultant product from the workpiece. By entering various data inputs, the computer programs itself to form a product having a desired configuration based upon the data entries. This machine preferably also includes a wheel dressing roller that is also controlled by the computer software. A regulating roller dressing wheel is also controlled by the computer software.

Of great advantage for the preferred embodiment is that the computer software is self-programming so that the computer writes its own programs. This is one of the features that provides one of the greatest advantages, because now nearly anyone can program a new cutting or grinding routine without having to reprogram the computer themselves.

In order to accomplish this self-programming feature, a computer program is installed on a computer usable medium, such as a normal Windows application. This enables a user through a user interface to control a rotationally operational machine for working a workpiece on the machine by utilizing pre-recorded audio commands that correspond to a predetermined series of computer commands relating to the entry of data values into the computer. By inputting desired data entries into the computer in response to those audio commands from the computer, the desired data entries relate to numerical values for parameters of the first and second rotational axes, radiuses of the desired resulting workpiece, length of time desired for the rotation, and data entries relating to numerical values for parameters of the desired angles in and taper back out, if applicable.

On one of the computer screens, a desired representative shape of a resulting product from a workpiece is selected from the computer screen illustrating reference configurations. Responding to further audio commands by inputting data entries relating to the desired parameters and dimensions of the desired resultant product, the machine begins operating the rotational motors under direction from the computer program to effect the desired result on the workpiece.

It is preferred to perform a step of dressing the rotationally operational machine components to true the components for better results prior to the rotational operation. That way, all the components are trued and the operation can proceed within the desired tolerances. A method of generating a computer program by a computer for rotationally operating a machine having at least one axis of rotation, includes the steps of first listening to the audio commands from the computer and inputting desired data entries requested by the audio commands pursuant to written examples on a computer screen display corresponding to individual audio commands.

Next, a desired shape is selected from the computer screen corresponding to the audio commands for that screen and then the machine is set to operate the computer program by running the computer and its software. Again, it is preferred to utilize a dressing routine for truing the rotational machine prior to performing the rotation operation.

In another preferred embodiment of the present invention, a method of operating an audio command computer controlled grinding machine having a computer, a grinding wheel and a regulating roller to grind a workpiece using the grinding wheel for grinding the outer surface of a workpiece having a rotational axis parallel to the longitudinal axis of the workpiece is disclosed which includes the following steps. First, a workpiece is loaded into the grinding machine between the grinding wheel and the regulating roller. Then, the operator listens to the audio commands and inputs desired data entries into the computer corresponding to those audio commands. The configuration of the desired resulting product is selected and data entries corresponding to parameter values are input into the computer, whereby a computer program is created by the computer for the desired operation. Of course, the workpiece could be loaded last if desired. The newly written program then directs the computer to perform the machine operation as input into the computer.

Also as described above, it is preferable to perform a step of truing the machine prior to the performance of the grinding operation. In the instance of a grinding machine, this step may include the steps of dressing both the grinding wheel and the regulating roller prior to the performance of the grinding operation.

Figure 3:
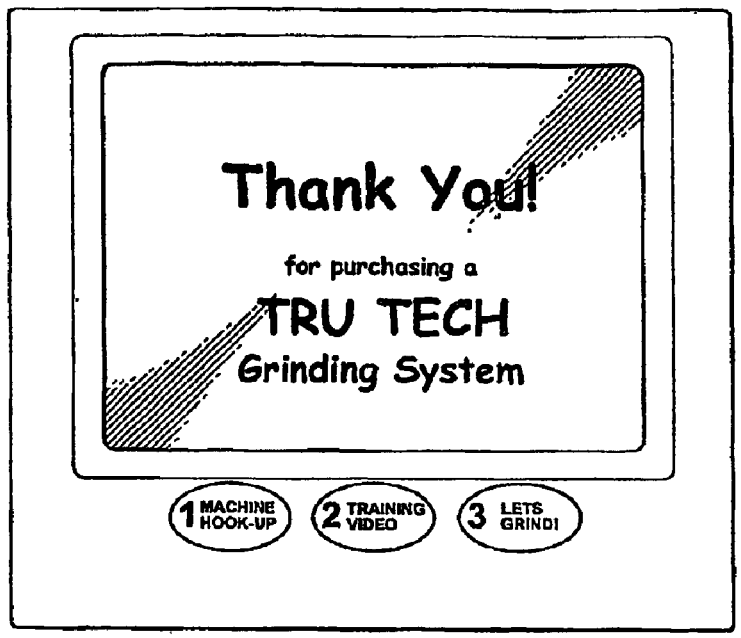
FIG. 3 is the opening page for the Pick-N-Place™ software in accordance with the present invention.

On the initial interactive functioning screen, FIG. 3 gives three main options, first a machine hook up (instructions for the absolute novice), which asks the trainee to plug in the grinding machine, make sure that all connections are necessary for grinding operations, and the like. Second, the operator is asked if they want to watch the training video, in case the operator is sure that all the machine hook-ups are already in place. Third, the "Let's Grind" button would be selected by an already trained operator, so that he may begin grinding operations.

Figure 4:
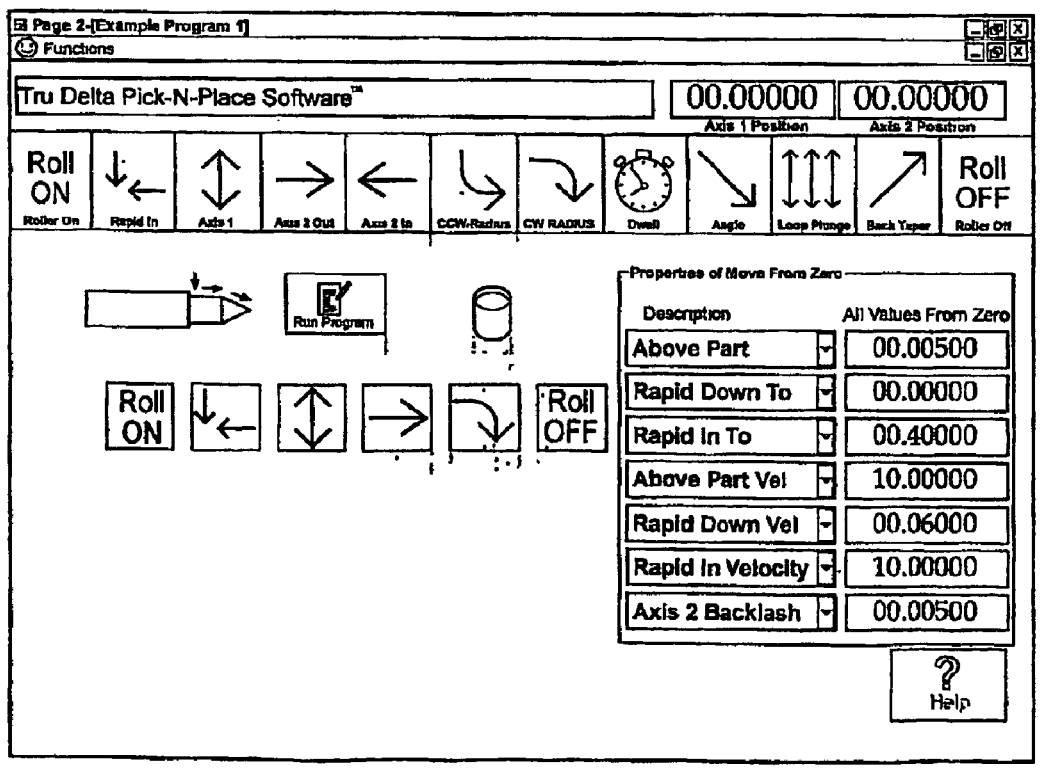
FIG. 4 is a representative screen displayed by the computer wherein certain limits are input.
Figure 5:
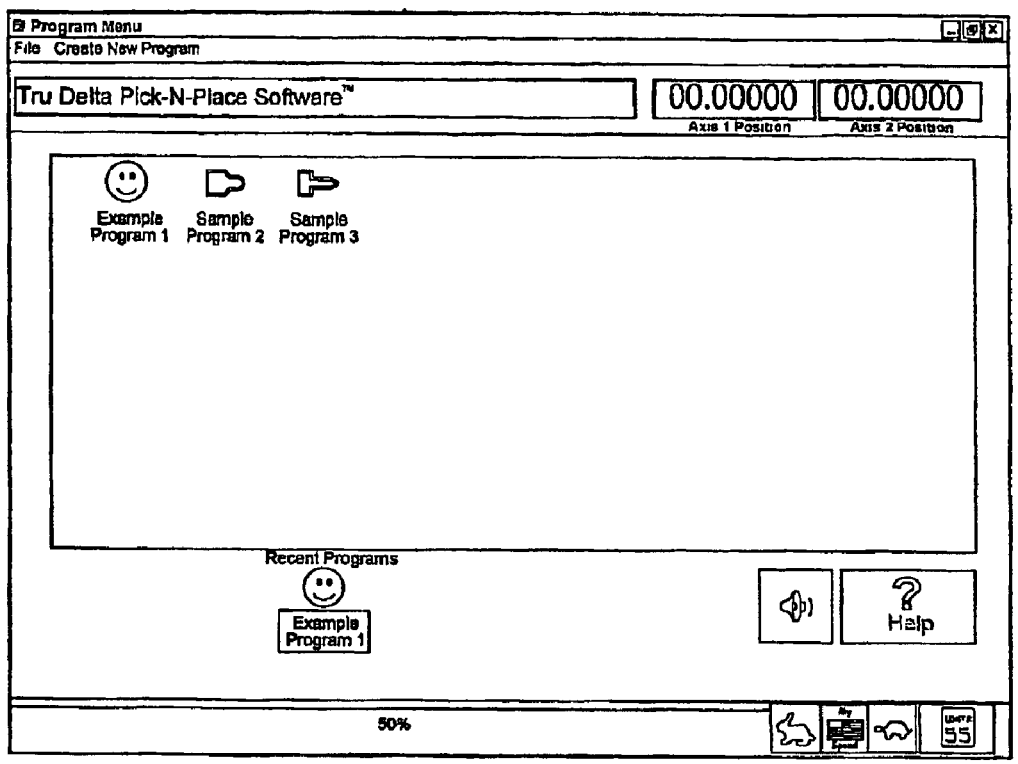
FIG. 5 is an example of one of the screens for selecting sample programs to follow.
Figure 6:
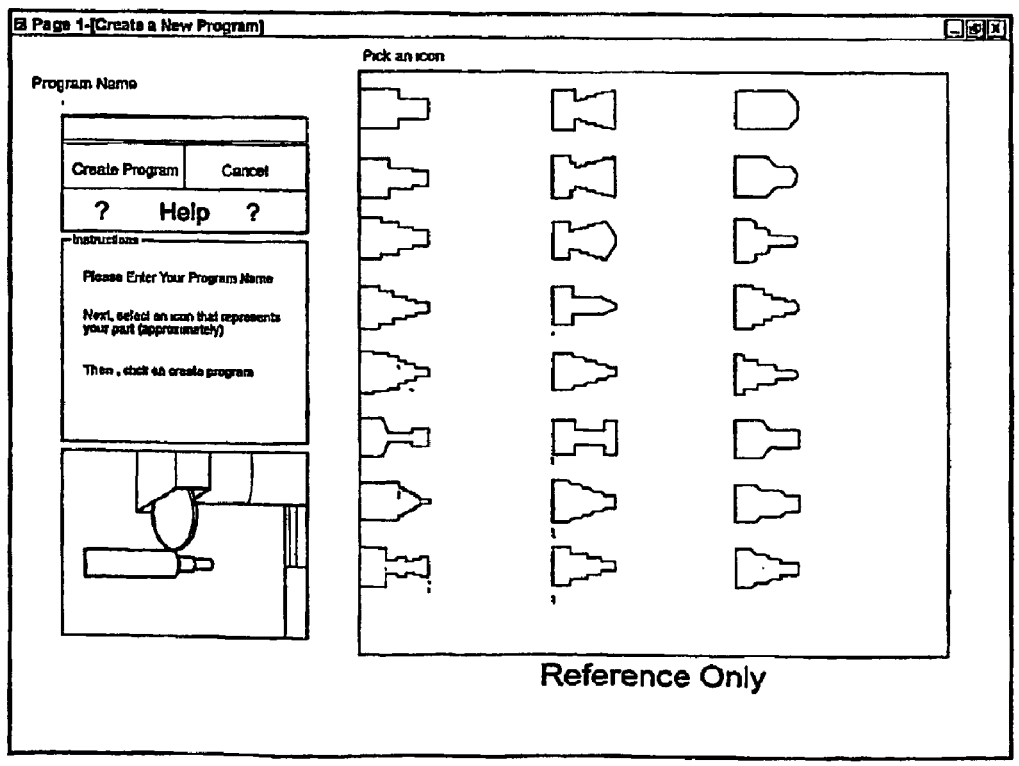
FIG. 6 is one of the computer screens which helps to create a new program for the grinding operation.
Figure 7:
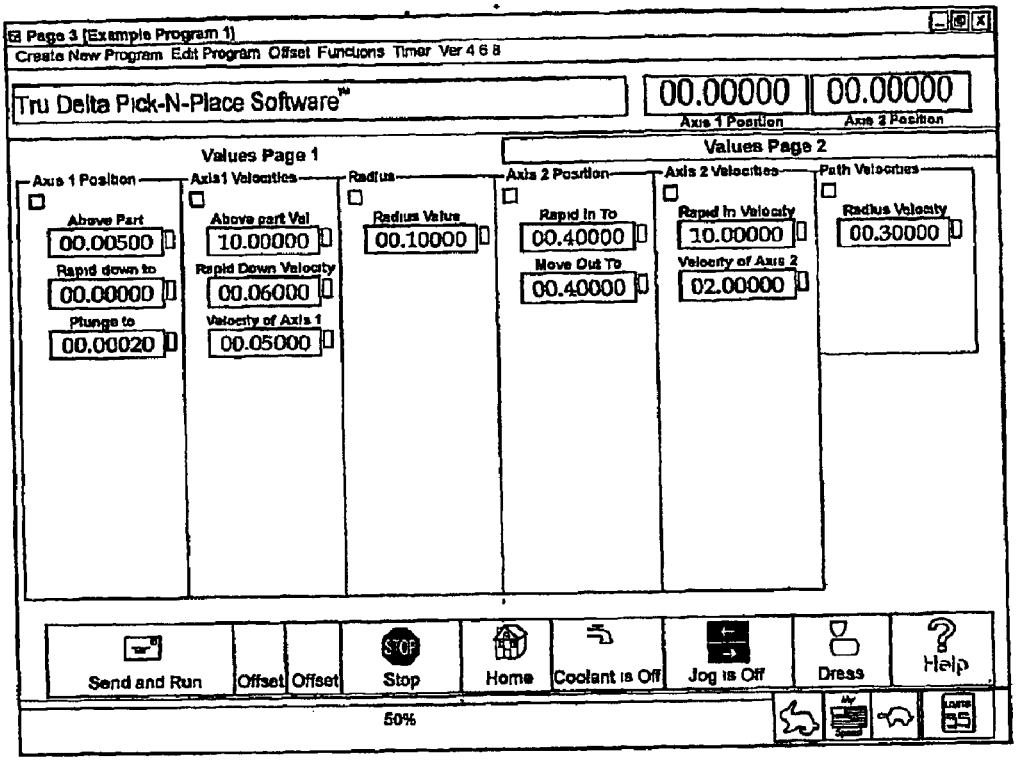
FIG. 7 is another computer screen which adds the entry data points to help create a new program.

FIG. 4 is an example screen, as the operator is shown what a previous operator wanted to accomplish, as far as the actual grinding is concerned. A voice from the computer will walk the trainee through each and every entry in the example. FIG. 5 is an important screen because this is the place where the trainee actually creates a new program by utilizing the software of the present invention. Again, recorded voice messages walk the trainee through. FIG. 6 allows the trainee to go to the next step, now that the program has been created by the computer, and FIG. 6 asks the operator to select an icon that most closely approximates the part desired to be ground. FIG. 7 shows a screen which corresponds with voice requests from the computer that asks the operator the variables needed to create a new software program for the grinding operation, along with further parameters to be set.

Figure 8:
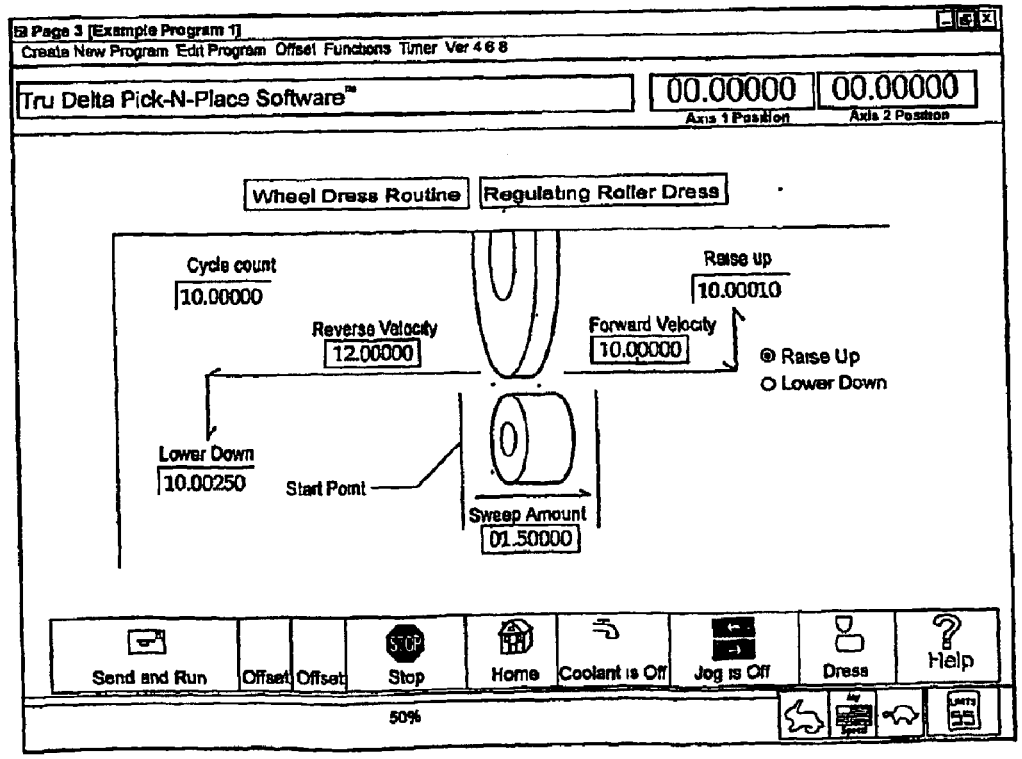
FIG. 8 is a computer screen showing the variables to be entered for the wheel dressing routine.

Moving now to FIG. 8, the dressing routine is addressed. The term "dressing" means that the grinding wheel is calibrated by being ground back to "true" so that the grinding operation can be as accurate as possible. If the grinding wheel was taken out of perfect round by the last grinding operation, the dressing operation will grind the grinding wheel back to true round. In this software, the dressing routine button contains two types of dressing modes. First is the wheel dress mode. This mode will dress the grinding wheel right on the machines using the dressing attachment mounted on the back of the Tru Tech centerless grinding unit. For this instance, only the number of dressing cycles is required. The rest is automatic, until dressing is complete.

Figure 9:
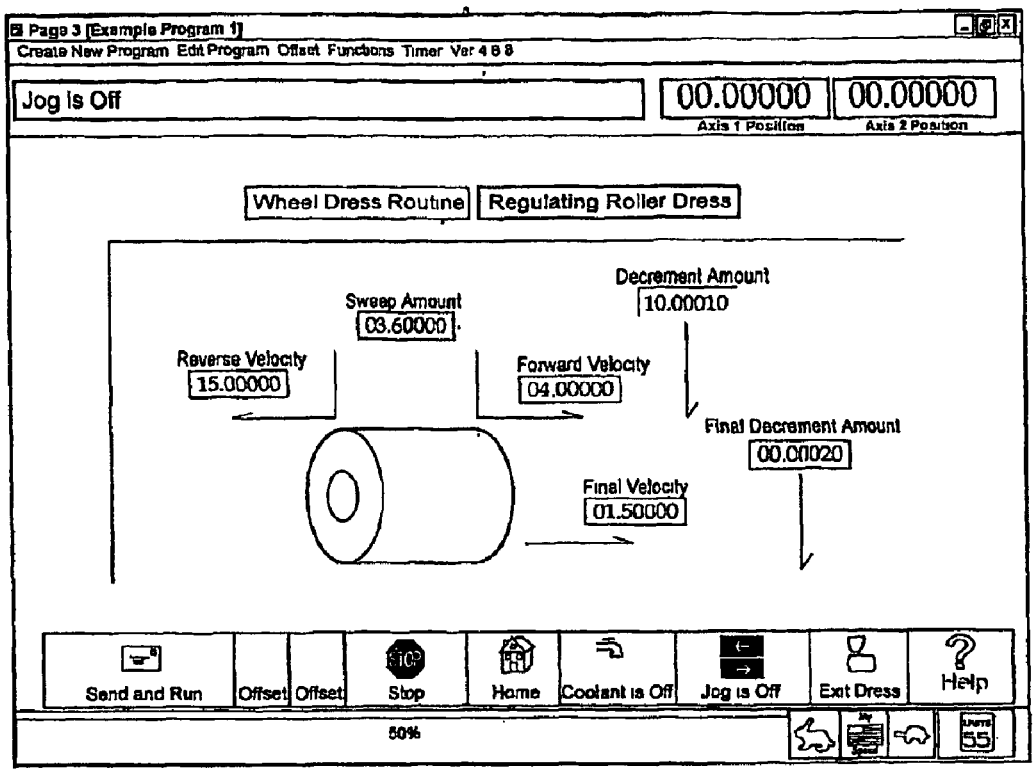
FIG. 9 is a full computer screen where the variables are entered in order to perform the dressing of the regulating roller.
Figure 10:
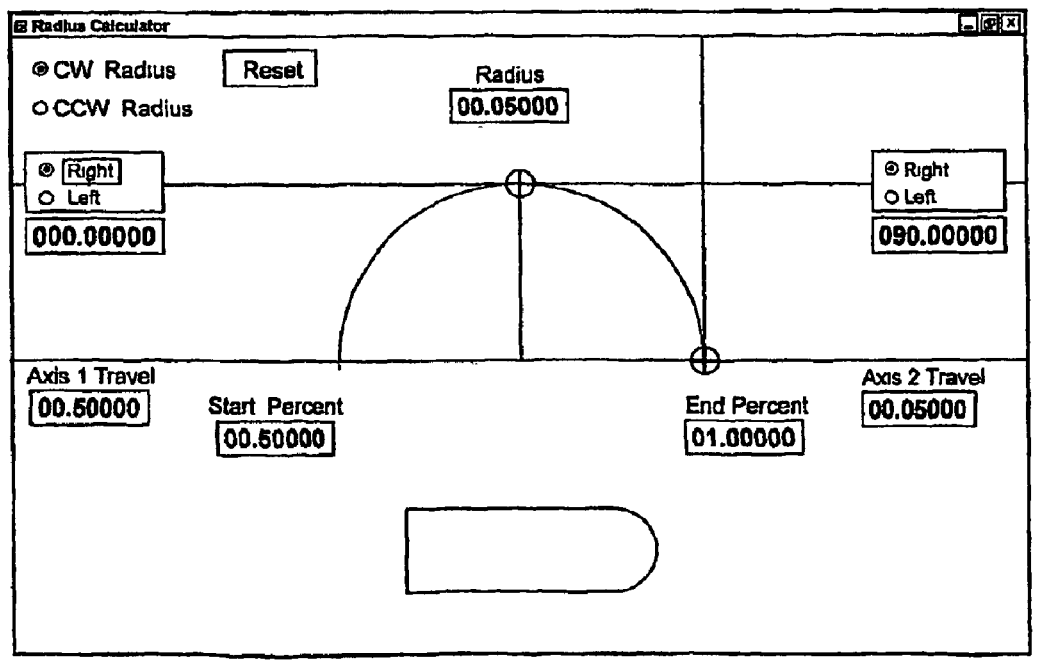
FIG. 10 is a full computer screen illustrating the radius calculator screen for the computer software.

FIG. 9 relates to the second type of wheel dress routine for the "Regulating Roller Dress" which dresses the regulating roller of the grinding machine. FIG. 10 again asks a number of questions for required values desired, and voice commands come to the trainee by the computer software to calculate the radius of the desired grinding profile.

Figure 11:
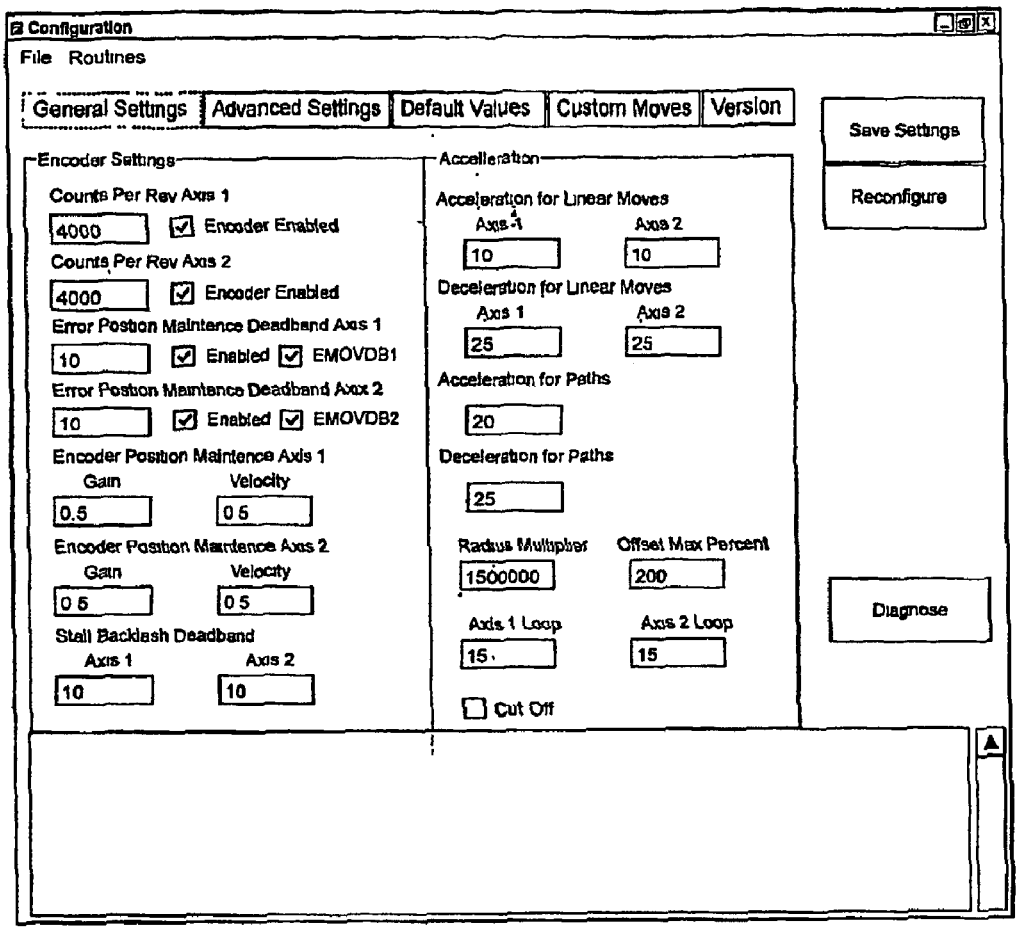
FIG. 11 is a full computer screen having information entered for the configuration.
Figure 12:
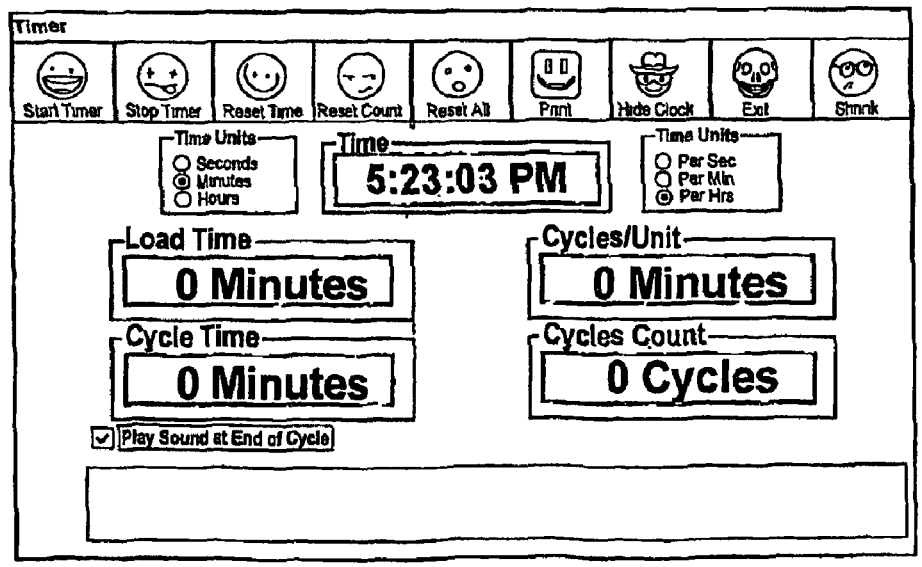
FIG. 12 is a full computer screen with the variables for the timer.
Figure 13:
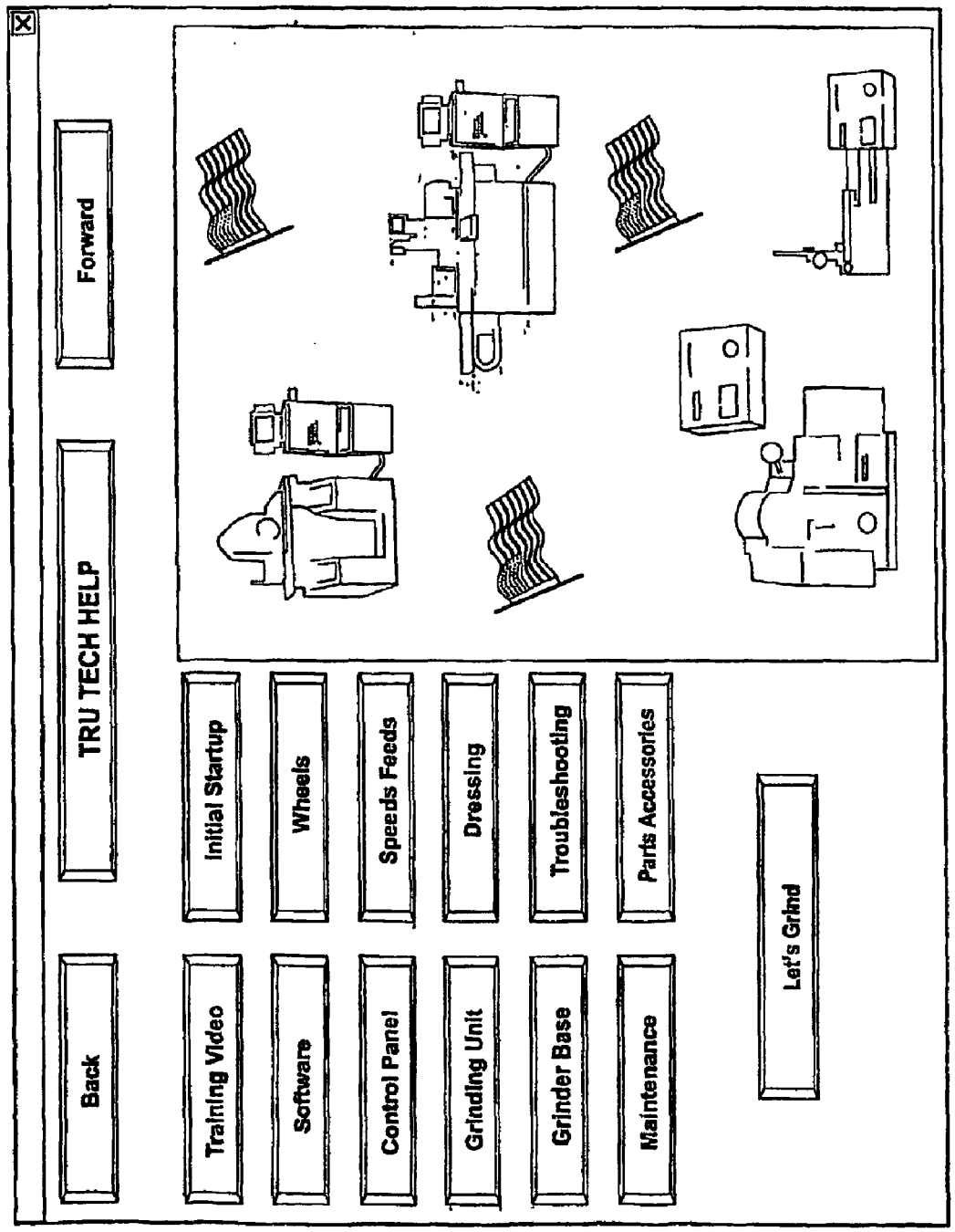
FIG. 13 the last full screen of the computer software.

FIG. 11 asks the operator many questions about configuration. Again, voice commands are heard by the trainee each step along the way to program a script editor. FIG. 12 shows the Timer values requested from the trainee, and the voice commands walk the trainee through. Comical "happy faces" with varying facial expressions may be used to show the trainee their progress. FIG. 13 is the final interactive functional screen, showing an index of all the various features which can be selected for training. While the rest of the figures illustrated the Training Video movie, there are other voice command walk-through videos, as indicated by the number of selections offered. Each of these selections will similarly train a novice, and help with voice commands.

While the present invention may be practiced with some physical button pushing, value entering, and mouse-selecting of options, it is envisioned by the present inventors that voice recognition and voice verification software can also be incorporated so that the trainee merely needs to speak his choices in order to complete the audio feature of the present embodiment. This voice recognition and verification software is prior art technology and has existed for many years, and would be an adjunct to the present software, being able to be added without any undue experimentation. In fact, the voice verification feature could be a safety feature added to a machine so that only a voice-printed recognized operator could operate the grinding machine. If the operator's voice was not verified, then the machine would be instructed to prevent the "imposter" from operating the machine. Voice recognition software could be utilized so that all the controls, value inputs and voice command requests could be fulfilled by the operator merely speaking his answers to those requests.

Figure 14:
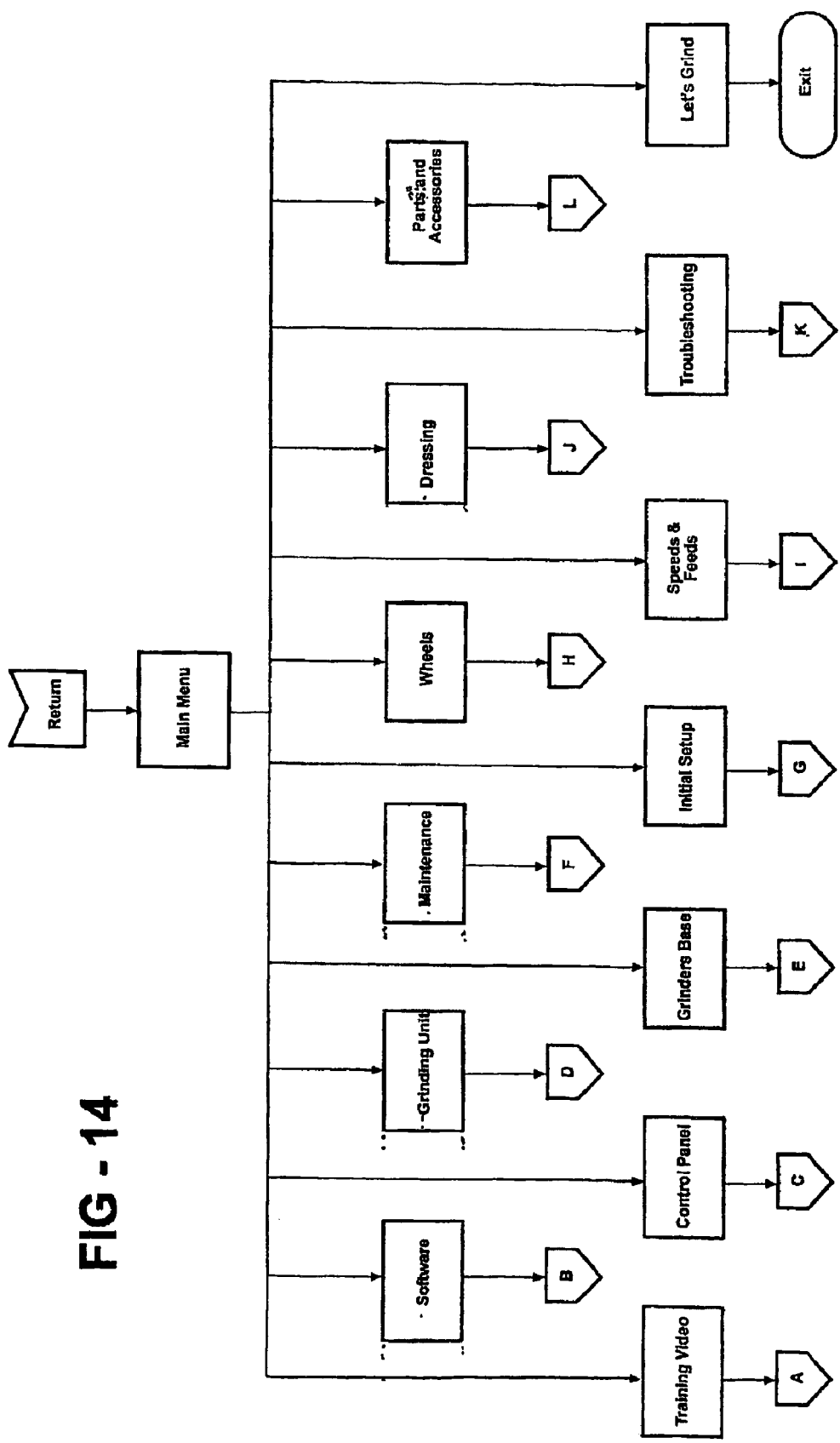
FIG. 14 is the computer software flow chart for the computer program.
Figure 15:
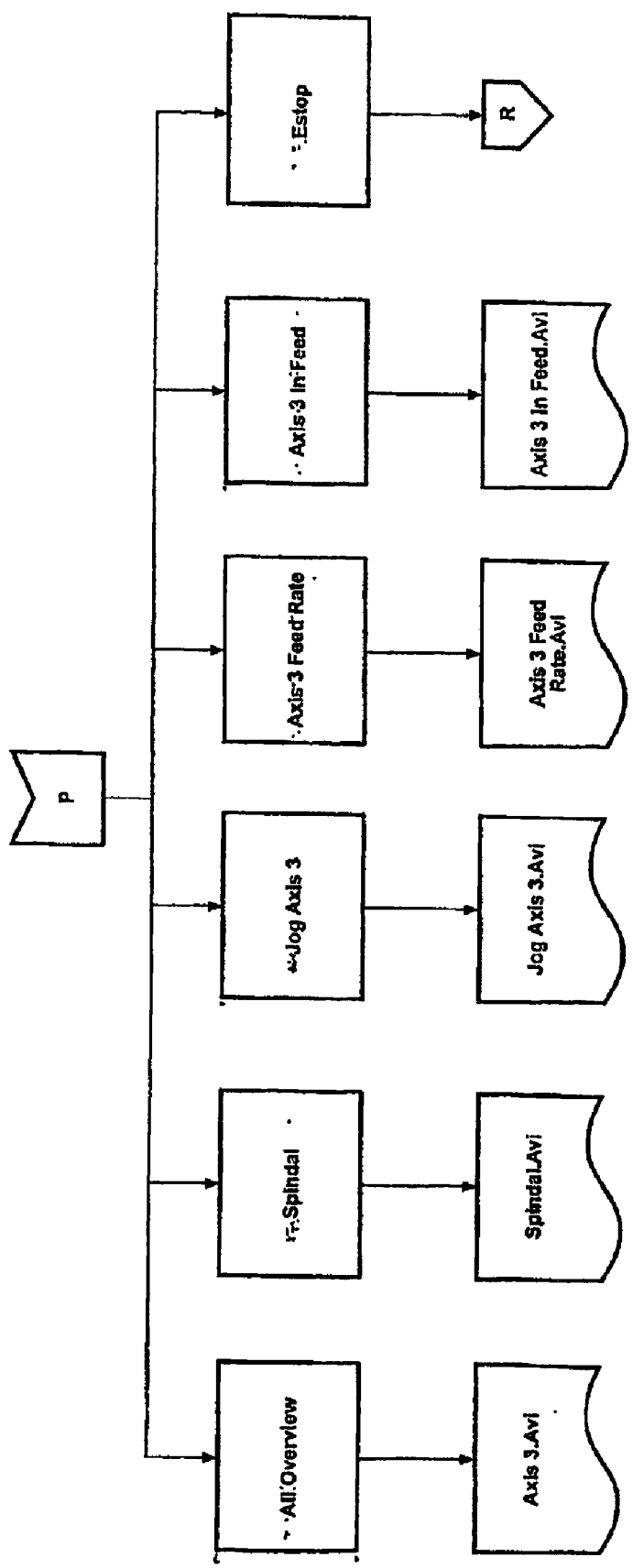
FIG. 15 is the full computer screen for the grinder base controls.
Figure 16:
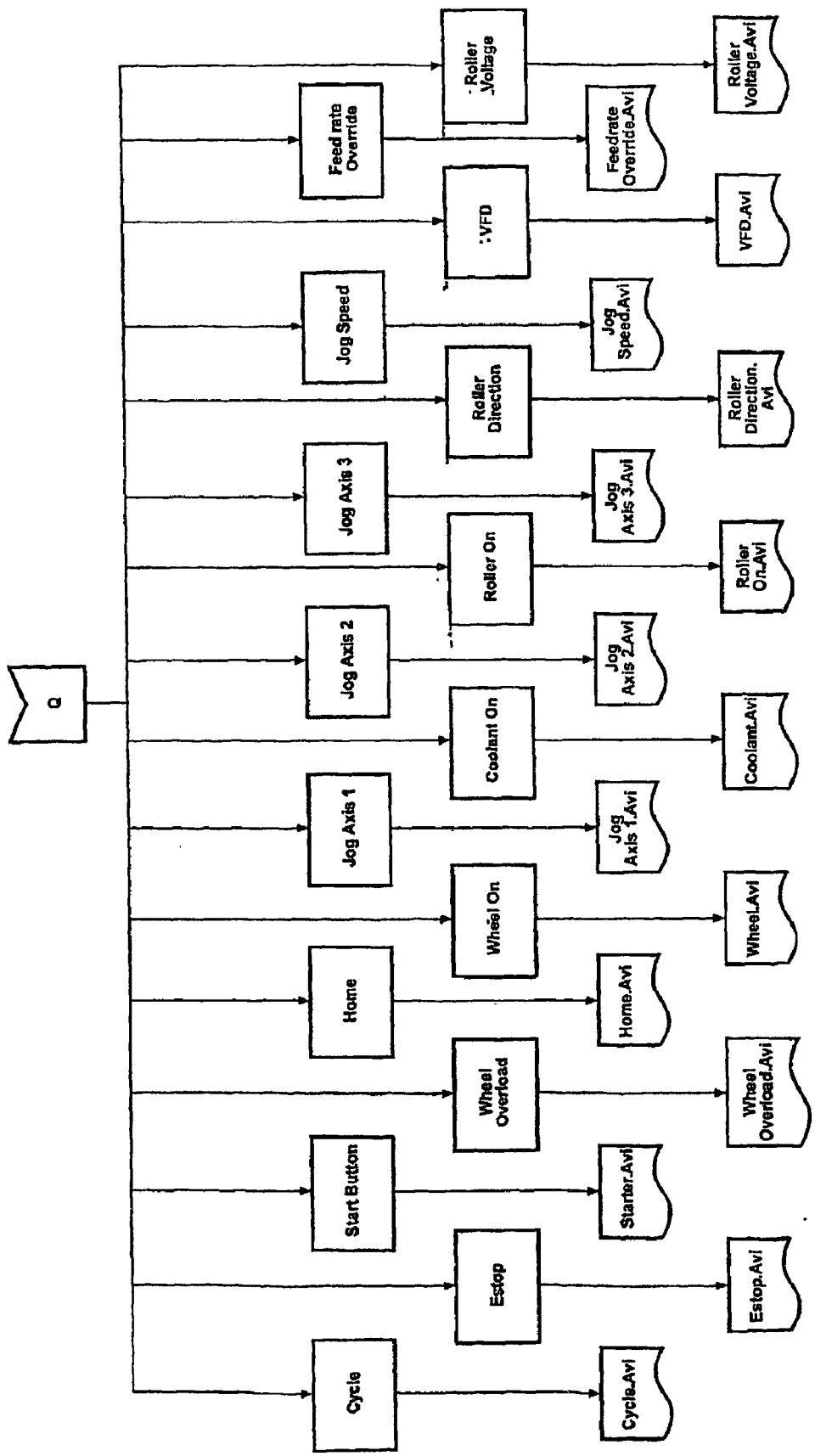
FIG. 16 is the full computer screen for the console controls.
Figure 17:
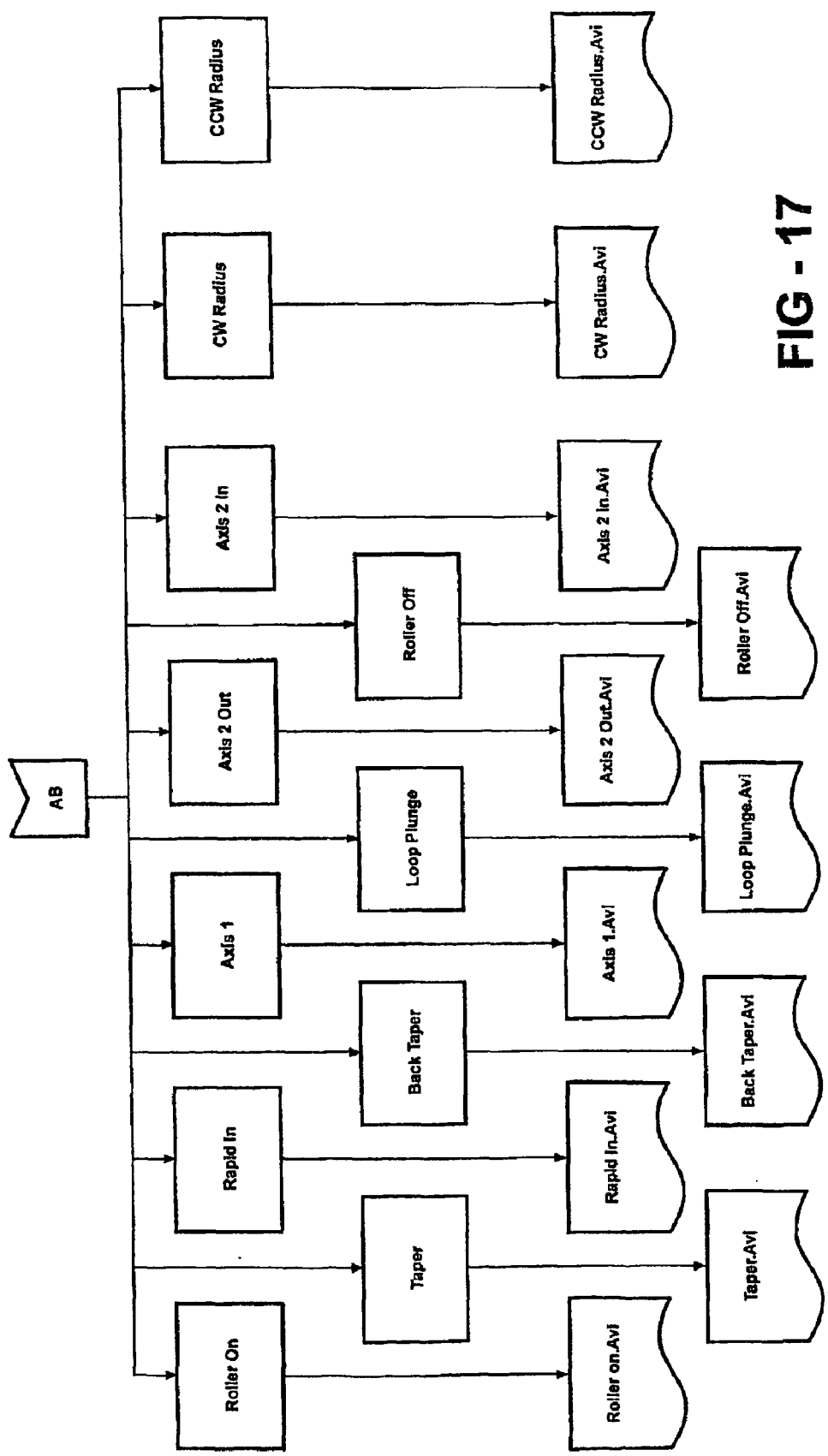
FIG. 17 is the full computer screen for the move descriptions.

FIG. 14 is a flow chart for the computer software for the main menu, while FIG. 15 shows the flow diagram for the grinder base controls software. FIGS. 16 and 17 show the flow diagrams for the control panel, grinding unit, grinder's base, maintenance, dressing, troubleshooting, parts and accessories, edit the program, grinder base controls, console controls, estops, move descriptions, speeds and feeds, wheels, functions, program menu, running the program, initial set-up, training video, and the Help Files Directory structure, respectively.

Therefore, in accordance with the present invention, a self-teaching audio command computer software guide has been disclosed which accomplishes all of the objects and advantages being sought, as described first hereinabove. Although the best mode embodiment was described with discussions about a computer software program that controls a centerless grinding machine, it must be noted that the same computer software could be used to operate a multitude of manufacturing operations as described hereinabove that require the creation of a computer program to operate a machine. The invention shall only be limited by the claims resulting ultimately from a filed and prosecuted utility patent application.

In summary, numerous benefits have been described which result from employing any or all of the concepts of the present invention. The rotational grinding machine, computer software, method of generating a computer program, and the method of grinding using the same, provide an easy-to-use and self-training computer program.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

INDUSTRIAL APPLICABILITY

The present invention finds particular application with regards to rotationally operated machines such as centerless grinding machines, but also finds utility with regard to any rotational machine which employs direction from a computer. The industrial applicability for the present invention therefore also includes lathes, polishers, buffers, cutting and tool machines, and any other rotational machine.

What is claimed is:

1. A computer controlled grinding machine to be run by a machine operator, comprising:
    a machine base;
    a workpiece support rotatable about spindle having a first rotational axis;
    a workpiece mounting attached to the workpiece support for securing the workpiece;
    a grinding wheel for grinding the workpiece;
    a regulating roller mounted on the spindle, said regulating roller for supporting and rotating the workpiece;
    a first rotating motor for rotating the workpiece about the first rotational axis;
    a second rotating motor for rotating the workpiece about the second rotational axis; and
    a computer controlled by computer software to direct the rotation and location of the first and second rotational axes;
    wherein said computer emits audio controls to the operator requesting the input of various data entries into the computer to correspond with a desired resultant product from the workpiece, whereby the computer programs itself to a desired configuration based upon the data entries.

2. The machine of claim 1, further comprising a wheel dressing roller that is also controlled by the computer software.

3. The machine of claim 1, further comprising a regulating roller dressing wheel that is also controlled by the computer software.

4. The machine of claim 1, wherein the computer software is self-programming so that the computer writes its own programs.

5. A computer program on a computer usable medium for enabling a user through a user interface to control a rotationally operational machine for working a workpiece on the machine, comprising the following steps:
    pre-recording audio commands and corresponding those audio commands to a predetermined series of computer commands relating to the entry of data values into the computer;
    inputting desired data entries into the computer in response to audio commands from the computer, said desired data entries including data entries relating to numerical values for parameters of the first and second rotational axes, radiuses of the desired resulting workpiece, length of time desired for the rotation, and data entries relating to numerical values for parameters of the desired angles in and taper back out;
    selecting a desired shape of resulting product from a workpiece from a computer screen illustrating reference configurations and responding to further audio commands by inputting data entries relating to the desired parameters and dimensions of the desired resultant product; and
    operating the rotational motors under direction from the computer program to effect the desired result on the workpiece.

6. The program of claim 5, further comprising a step of dressing the rotationally operational machine components to true the components for better results.

7. A method of generating a computer program by a computer for rotationally operating a machine having at least one axis of rotation, including the following steps:
    listening to audio commands and inputting desired data entries requested by the audio commands pursuant to written examples on a computer screen display corresponding to individual audio commands;
    selecting a desired shape from a computer screen corresponding to the audio commands for that screen; and
    operating the computer program by running the computer.

8. The method of claim 7, further comprising inputting desired data entries based upon a dressing routine for truing the rotational machine prior to performing the rotation operation.

9. A method of operating an audio command computer controlled grinding machine having a computer, a grinding wheel and a regulating roller to grind a workpiece using the grinding wheel for grinding the outer surface of a workpiece having a rotational axis parallel to the longitudinal axis of the workpiece, comprising:
    loading a workpiece into the grinding machine between the grinding wheel and the regulating roller;
    listening to the audio commands and inputting desired data entries into the computer corresponding to those audio commands;
    selecting a configuration of the desired resulting product and inputting data entries corresponding to parameter values into the computer, whereby a computer program is created by the computer for the desired operation; and
    directing the computer to perform the grinding operation as input into the computer.

10. The method of claim 9, further comprising a step of dressing the grinding wheel prior to the performance of the grinding operation.

11. The method of claim 9, further comprising a step of dressing the regulating roller prior to the performance of the grinding operation.

* * * * *